United States Patent Office 3,053,903
Patented Sept. 11, 1962

---

3,053,903
PRODUCTION OF HIGH MOLECULAR WEIGHT POLYOXYALKYLENE COMPOUNDS
Stephen D. Holland, Urmston, Manchester, England, assignor to Shell Oil Company, a corporation of Delaware
No Drawing. Filed Dec. 9, 1958, Ser. No. 779,044
Claims priority, application Great Britain Dec. 11, 1957
4 Claims. (Cl. 260—615)

This invention relates to the production of polyoxyalkylene compounds and relates more particularly to the production of polyoxyalkylene compounds of higher molecular weight from polyoxyalkylene compounds of lower molecular weight.

In this specification, the expression "polyoxyalkylene compound" means a polyoxyalkylene compound containing at least four oxyalkylene groups obtained by condensing an organic compound containing one or more hydroxy, carboxyl, mercapto or amino groups with an alkylene oxide or a plurality of alkylene oxides.

It is known that polyoxyalkylene compounds may be obtained by the addition reaction of an alkylene oxide to a lower molecular weight polyoxyalkylene compound in the presence of alkaline catalyst. Synthesis of high molecular weight polyoxyalkylene compounds, for example those having molecular weights in the range 8,000 to 25,000 starting from a low molecular weight polyoxyalkylene compound, for example one having a molecular weight in the order of 300, is accompanied by a very large increase in the volume of the reaction mixture. This is even more so when starting from an even simpler molecule. In order to obtain, for example, polyethylene glycol having a molecular weight of 9,000 in a single-stage reaction from mono-, di- or tri-ethylene glycol, the quantity of the glycol employed as starting material is small in relation to the ultimate quantity of product obtained and therefore in relation to the total reactor volume. When standard types of reactors are employed, such reactions are inefficient. In order to deal with this problem, an alternative system of condensation may be used, viz: a multi-stage process. For example in a two-stage process mono-, di- or tri-ethylene glycol may be reacted with ethylene oxide in the presence of an alkaline catalyst to form a full reactor batch of polyglycol of molecular weight of, say, 1,500. Part of this material may then be removed from the reactor, further catalyst added and the reaction continued to the desired molecular weight. However, owing to the fact that the alkaline catalysts normally employed are difficulty soluble in the higher molecular weight polyglycols, it is not efficient to add the alkaline catalyst as such to the reaction mixture at the end of the first stage. It is possible to add the catalyst to the reaction mixture in solution in a lower molecular weight glycol or polyglycol but, as these lower compounds contain free hydroxyl groups which are capable of initiating the growth of new polymer chains, the final average molecular weight of the product at the end of the multi-stage process will be lower than would have been the case in the absence of these added lower molecular weight compounds.

It has now been found that a multi-stage process can be carried out without lowering the final average molecular weight by introducing the catalyst into the system during the course of the process as a solution in a polyoxyalkylene compound having substantially same or substantially similar molecular weight as the materials already present in the reactor.

The alkaline catalysts are generally difficult to dissolve in polyoxyalkylene compounds as such. A method enabling the obtaining of the desired catalyst solutions efficiently is described herein.

In the production of a high molecular weight polyoxyalkylene compound by the reaction of an alkylene oxide with an organic compound, for example, a mono-, di- or tri-ethylene glycol, wherein the alkylene oxide is added to the starting organic reactant and its further addition is effected continuously or intermittently through the course of the process at the reaction conditions, the resulting polyoxyalkylene reaction product will assume a progressively increasing molecular weight during the course of the reaction. In accordance with the invention, catalyst is added intermittently during the course of the reaction as a solution in a solvent which solvent has a molecular weight substantially equal to, or approximating, that of the polyoxyalkylene reaction product in the reaction mixture at the time of the catalyst addition. During the course of the process solvents used for successive catalyst additions will progressively increase in molecular weight as the reaction proceeds. Preferred solvents comprise the intermediate polyoxyalkylene reaction products formed within the system. Thus, in a stage-wise operation wherein the polyoxyalkylene compound-containing reaction mixture obtained in one stage is used as charge to a subsequent stage, the catalyst will be added to the said subsequent stage as a solution in a portion of the polyoxyalkylene reaction product formed in the preceding stage.

The present invention therefore provides a process enabling the more efficient production of higher molecular weight polyoxyalkylene compounds from polyoxyalkylene compounds of lower molecular weight by adding to said polyoxyalkylene compounds of lower molecular weight a solution of an alkaline catalyst in the lower molecular weight polyoxyalkylene compound or in one having substantially the same molecular weight, and reacting the resulting solution with an alkylene oxide. The process may be repeated one or more times to give a product of the desired molecular weight.

Suitable alkaline catalysts comprise the alkali metals and the oxides, hydroxides, carbonates and alkoxides thereof. Preferred catalysts comprise sodium or potassium hydroxide or sodium or potassium methoxide, ethoxide or propoxide.

The alkylene oxide employed is usually a 1,2-alkylene oxide, for example, ethylene oxide, 1,2-propylene oxide, 1,2-butene oxide, mixtures thereof, etc. Other alkylene oxides such as butadiene monoxide, amylene oxides, etc., may be employed; also alkylene oxides such as cyclohexene oxide and styrene oxide may be used. Therefore, the term "alkylene oxide" as used in this specification is intended to include cycloalkene oxides and aryl-substituted alkylene oxides.

Starting materials reacted with alkylene oxide to obtain polyoxyalkylene compounds comprise organic compounds having at least one hydroxy carboxyl, mercapto or amino groups, disclosed heretofore as being able to undergo condensation reaction with alkylene oxide in the presence of an alkaline catalyst with the formation of a reaction mixture comprising a polyoxyalkylene compound. Such suitable organic starting materials comprise the mono- and poly-hydric alcohols, fatty acids, phenols, mercaptans, amines, and the like.

The lower molecular weight polyoxyalkylene compounds may suitably comprise the starting material reacted with the alkylene oxide in accordance with the present invention. Thus, the lower molecular weight polyoxyalkylene compound may be a simple polyglycol made by the condensation of an alkylene oxide with a glycol or it may be a polyoxyalkylene compound having an ether, thioether, ester or amine group at the end of the chain, for example, a compound made by condensing an alkylene oxide with a simple alcohol, such as ethyl, propyl or butyl alcohol or a mixture of alcohols made by the Oxo process, or with a monoalkyl ether of a glycol or polyglycol, such as the monobutyl ether of diethylene glycol, or with a monocarboxylic acid ester of a glycol or polyglycol, such as ethylene glycol monoacetate. However, the present invention is of particular importance in the production of higher polyglycols, such as polyethylene and polypropylene glycols, and in described the invention in more detail its application to the production of such polyglycols will be referred to.

As already mentioned, the alkaline catalysts are generally not readily soluble in the polyoxyalkylene compound and it has been found that special methods have to be used to obtain the necessary catalyst solutions for use in the present invention. The alkaline catalyst can be put into solution in the polyoxyalkylene compound by mixing it with that compound in the presence of a mutual solvent for the two materials. The mutual solvent is removed before the solution is added to the condensation reaction mixture. Suitable mutual solvents comprise the lower boiling aliphatic alcohols, such as, for example, methanol, ethanol, propanol, the butanols, etc. Thus a solution of sodium methoxide in methanol may be added to a polyoxyalkylene compound of the appropriate molecular weight, the whole intimately mixed, and the methanol solvent subsequently removed from the admixture by evaporation. This will leave a solution of sodium methoxide in the polyoxyalkylene compound. The specific polyoxyalkylene compound chosen as solvent being of course one having substantially the molecular weight of the polyoxyalkylene reactant to which the solution is to be added.

In reacting the alkylene oxide with the polyoxyalkylene reactant in accordance with the invention, the solution of the alkaline catalyst in the polyoxyalkylene solvent is added to the polyoxyalkylene reactant and the required amount of alkylene oxide is then added. The resulting mixture is then allowed to reach the desired reaction temperature, if necessary with the aid of external application of heat, at which it is maintained for the required time, usually with constant or intermittent stirring. In some cases external cooling may be necessary to remove excess heat of reaction in the initial stages. When intermediate products are withdrawn from the reactor this is preferably done at the lowest possible temperature consistent with easy handling.

Conditions of temperature and pressure favoring the reaction of an alkylene oxide with a polyoxyalkylene compound are well known. Thus, the reaction temperature may be between 50° C. and 160° C., and preferably between 115° C. and 125° C. The pressure may be between 5 and 200 lbs. p.s.i. and preferably between 10 and 60 lbs. p.s.i. The proportion of catalyst used is generally in the order of .05% to 1% by weight of the total amount of reactants which will appear in the product at the end of that particular stage. The reaction may be carried out in the presence of inert solvents.

After condensation reaction has proceeded and the final product desired obtained, the reaction mixture is treated to neutralize the alkaline catalyst. This may be done, for example, by treatment with an acid-activated clay or earth as described and claimed in copending application Serial No. 778,275, filed December 5, 1958, and now abandoned, or with phosphoric acid or carbon dioxide, and the resulting product stripped of volatile constituents and then filtered to remove any salts formed during the neutralization step. This salt removal is important since the products usually have to meet a maximum ash content specification and if large quantities of catalysts are used it is not always possible to meet these ash content specifications by normal neutralizing and filtering methods. Hence, in a multi-stage process, particularly if products of different molecular weight are required for marketing from each of the various stages, each completed stage must be such that the ash content of the product is below the specification maximum. Therefore sufficient catalyst cannot be used initially to reach the final desired molecular weight.

Polyoxyalkylene compounds, comprising for example copolymers of ethylene oxide and/or propylene oxide, having molecular weights of from about 8,000 to about 25,000 are obtained efficiently in accordance with the invention.

The following example illustrates but is not intended to limit the scope of the present invention.

*Example*

The starting material was polyethylene glycol having a molecular weight of 300.

650 parts by weight of this polyethylene glycol were charged to the reactor and there was added 101.5 parts by weight of a solution of sodium methoxide in the same polyethylene glycol. This solution had been obtained by dissolving 1.5 parts by weight of sodium methoxide in 50 parts by weight of methanol, adding this resulting solution to 100 parts by weight of the same polyethylene glycol in a liquefied condition, and stripping off the methanol at 60° C. under vacuum. Ethylene oxide was then passed into the reactor and the temperature controlled at 120° C.–125° C. The viscosity of the reaction mixture was periodically tested and when it reached 23 centistokes at 210° F. ethylene oxide addition was stopped. The product then had a molecular weight of about 1,500.

60 percent of the contents of the reactor were run off and worked up as described below to make a finished polyethylene glycol of molecular weight about 1,500, except for 100 parts by weight which were used to make the new catalyst solution by adding to it 1.3 parts by weight of sodium methoxide in 75 parts by weight of methanol and stripping off the methanol at 60° C. under vacuum. This new catalyst solution was added to the reactor containing the remaining 40% of the crude polyethylene glycol; ethylene oxide again passed into the reactor; and the temperature was again controlled at 120° C.–125° C. The viscosity of the reaction mixture was periodically tested and when it reached 97 centistokes at 210° F. ethylene oxide addition was stopped. The product then had a molecular weight of about 4,000.

About 50% of the contents of the reactor were run off and worked up as described below to make a finished polyethylene glycol of molecular weight about 4,000 except for 100 parts by weight which were used to make the new catalyst solution by adding to it 1.3 parts by weight of sodium methoxide in 75 parts by weight of methanol and stripping off the methanol at 60° C. under vacuum. This new catalyst solution was added to the reactor containing the remaining 50% of the crude polyethylene gylcol; ethylene oxide again passed into the reactor; and the temperature was again controlled at 120° C.–125° C. The viscosity of the reaction mixture was periodically tested and when it reached 940 centistokes at 210° F. ethylene oxide addition was stopped. The product then had a molecular weight of about 9,000. The quantities were so chosen that the reactor was never full.

The contents of the reactor were neutralized to a pH 7 with acetic acid, blown to remove any excess ethylene oxide and filtered. The working up of each of the finished polyethylene glycols prepared in this process was carried out in the same manner.

The invention claimed is:

1. In the process for the production of high molecular weight polyoxyalkylene compounds wherein a 1,2-alkylene oxide havig from two to four carbon atoms is reacted with a compound selected from the group consisting of mono- and polyhydric alcohols in the presence of a catalyst selected from the group consisting of the alkali metals and the oxides, hydroxides, carbonates and alkoxides of the alkali metals, at a temperature of from about 50° to about 160° C. in a reaction zone, and wherein said catalyst is introduced into said reaction zone intermittently during the course of the process, the steps which comprise admixing said catalyst with a polyoxyalkylene solvent and a mutual solvent for said catalyst and said polyoxyalkylene solvent outside of said reaction zone, distilling said mutual solvent from the resulting mixture, thereby forming a catalyst solution consisting essentially of said catalyst and said polyoxyalkylene solvent, introducing said catalyst in the form of said resulting catalyst solution into said reaction zone at each of said intermittent catalyst additions, employing as said polyoxyalkylene solvent for said calalyst a portion of the polyoxyalkylene reaction product present in said reaction zone at the time of effecting said introduction of said catalyst solution into said reaction zone and introducing into said reaction zone during each of said intermittent additions an amount of said catalyst solution containing from about 0.05% to about 1% by weight of said catalyst based upon the amount of reactants to be reacted at the time of said catalyst addition.

2. In the process for the production of high molecular weight polyoxyalkylene compounds wherein a 1,2-alkylene oxide having from two to four carbon atoms is reacted with a glycol in the presence of a catalyst selected from the group consisting of the alkali metals and the oxides, hydroxides, carbonates and alkoxides of the alkali metals, at a temperature of from about 50° to about 160° C. in a reaction zone, and wherein said catalyst is introduced intermittently into said reaction zone during the course of the process, the steps which comprise admixing said catalyst outside of said reaction zone with a polyoxyalkylene solvent and a mutual solvent for said catalyst and said polyoxyalkylene solvent, distilling said mutual solvent from the resulting catalyst-polyoxyalkylene solvent mixture, thereby forming a catalyst solution consisting essentially of said catalyst and said polyoxyalkylene solvent, introducing said catalyst in the form of said catalyst solution into said reaction zone at each of said intermittent catalyst additions, employing as said polyoxyalkylene solvent a polyoxyalkylene compound which has substantially the same molecular weight and composition as the polyoxyalkylene reaction product present in said reaction zone at the time of effecting each of said intermittent catalyst introductions into said reaction zone and introducing into said reaction zone during each of said intermittent additions an amount of said catalyst solution containing from about 0.05% to about 1% by weight of said catalyst based upon the amount of reactants to be reacted at the time of said catalyst addition.

3. The process in accordance with claim 2 wherein said mutual solvent is a lower aliphatic alcohol.

4. The process in accordance with claim 3 wherein said alcohol is methanol.

References Cited in the file of this patent

UNITED STATES PATENTS

| | | |
|---|---|---|
| 2,554,667 | De Groote | May 29, 1951 |
| 2,839,477 | De Groote | June 17, 1958 |

OTHER REFERENCES

Hill et al.: Industrial and Engineering Chemistry, vol. 50, No. 1, January 1958, pp. 5–7. (Copy in Library.)